US008628593B2

(12) United States Patent
Moulijn et al.

(10) Patent No.: US 8,628,593 B2
(45) Date of Patent: Jan. 14, 2014

(54) PROCESS TO SEPARATE LIPIDS FROM LIPID-CONTAINING BIOMASS FOR PRODUCING PLATFORM CHEMICALS AND/OR LIQUID BIOFUELS

(75) Inventors: Jacob A. Moulijn, Delft (NL); Sjoerd Daamen, Barcelona (NL); Paul O'Connor, Hoevelaken (NL); Rob Van Der Meij, Amersfoort (NL)

(73) Assignee: BOleCON International Holding N.V., Curaçao ( * ) Notice: Subject to any disclaimer, the term of this patent is extended or adjusted under 35 U.S.C. 154(b) by 237 days.

(21) Appl. No.: 13/030,277

(22) Filed: Feb. 18, 2011

(65) Prior Publication Data

US 2011/0225878 A1    Sep. 22, 2011

Related U.S. Application Data

(63) Continuation of application No. PCT/EP2009/060693, filed on Aug. 18, 2009.

(30) Foreign Application Priority Data

Aug. 18, 2008   (EP) .................................... 08162558

(51) Int. Cl.
| *C10L 1/198* | (2006.01) |
| *C10L 1/19* | (2006.01) |
| *C10L 5/40* | (2006.01) |
| *C09H 1/00* | (2006.01) |
| *C08H 8/00* | (2010.01) |
| *C08B 37/14* | (2006.01) |
| *C08B 17/02* | (2006.01) |
| *C08B 17/06* | (2006.01) |
| *C08B 15/08* | (2006.01) |

(52) U.S. Cl.
USPC ................. 44/388; 44/307; 44/605; 530/356; 530/357; 530/402; 536/20; 536/30

(58) Field of Classification Search
USPC ............ 44/307, 388, 605; 530/356, 357, 402; 536/20, 30
See application file for complete search history.

(56) References Cited

U.S. PATENT DOCUMENTS

| 2006/0241287 A1 | 10/2006 | Hecht |
| 2008/0023162 A1* | 1/2008 | Myllymaki et al. .......... 162/163 |
| 2008/0190013 A1* | 8/2008 | Argyropoulos ................. 44/307 |
| 2009/0234146 A1* | 9/2009 | Cooney et al. ................ 554/174 |

FOREIGN PATENT DOCUMENTS

| EP | 1942095 A2 | 7/2008 |
| WO | 03029329 A2 | 4/2003 |
| WO | 2005017001 A1 | 2/2005 |
| WO | 2005017252 A1 | 2/2005 |
| WO | 2008098032 A2 | 8/2008 |

OTHER PUBLICATIONS

Fischer et al. 2003. Inorganic Molten Salts as Solvents for Cellulose. Cellulose, vol. 10, No. 3, pp. 227-236.*
Vapor Pressure of Water. From Wikipedia, the free encyclopedia,http://en.wikipedia.org/wiki/Vapour pressure of water, Printed Jul. 25, 2012.*
Kranich et al. 1980. Oil and Gas from Cellulose by Catalytic Hydrogenation. The Canadian Journal of Chemical Engineering, vol. 58, pp. 735-738.*
Hilton et al. 1955.The Role of Hydrogen in Raney Nickel Catalyst. Journal of Physical Chemistry, vol. 59, No. 9, pp. 820-822.*
International Search Report for PCT/EP2009/060693 (issued Nov. 19, 2009).
European Search Report for EP2157155 (issued Jan. 16, 2009).
Rayne et al., Rapid Dissolution of Lignocellulosic Plant Materials in Ionic Liquid, Nature Precedents hdl:10101/npre.2007.637.1, posted Aug. 7, 2007.

* cited by examiner

*Primary Examiner* — Jon P Weber
*Assistant Examiner* — Kailash C Srivastava
(74) *Attorney, Agent, or Firm* — Hoyng Monegier LLP; Coraline J. Haitjema; David P. Owen

(57) ABSTRACT

The process described in the instant invention has the steps of dissolving the lipid-containing biomass in an ionic liquid, whereby a lipid phase and a hydrophilic phase are formed. The lipid phase contains primarily triglycerides, which can be converted to biodiesel by transesterification to, e.g., methyl esters. The hydrophilic phase comprises dissolved biopolymers, such as cellulose, hemicellulose, and protein. The biopolymers are converted in situ to compounds that are insoluble in the molten inorganic salt hydrate. The molten inorganic salt hydrates regenerated by removing insolubles, such as lignin, ash from the biomass, and water.

16 Claims, No Drawings

PROCESS TO SEPARATE LIPIDS FROM LIPID-CONTAINING BIOMASS FOR PRODUCING PLATFORM CHEMICALS AND/OR LIQUID BIOFUELS

CROSS-REFERENCE TO RELATED APPLICATIONS

This application is a continuation application of PCT/EP2009/060693 filed on 18 Aug. 2009, which claims priority to 08162558.4 filed on 18 Aug. 2008, both applications of which are incorporated by reference in their entireties.

BACKGROUND OF THE INVENTION

1. Field of the Invention

The invention relates generally to the conversion of lipid-containing biomass, and more particularly to the conversion of lipid-containing biomass to liquid fuels and/or platform chemicals.

2. Description of the Related Art

Lipid-containing biomass is abundantly available. Many crops are grown for their oil content. The oil is recovered from the crop, generally by pressing. The oils are generally used for human food or animal feed. Examples of oil crops include olives, palm, flax seeds, sunflower seeds, and the like.

Crops producing oils having high levels of poly-unsaturated fatty acids have been used since antiquity for producing varnishes and lacquers. Due to their highly unsaturated nature such oils "harden" when exposed to oxygen in the air. These oils are in general not suitable for use as foods, because of their instability and unattractive taste.

In modern times oil crops have been grown for the production of so-called "biodiesel". In Europe, extensive areas of arable land have been devoted to the cultivation of rapeseed in order to meet European Union targets for renewable energy resources. The use of valuable land for this purpose has met with strong opposition, as food shortages have begun to drive up food prices.

The production of vegetable food oils leaves significant amounts of residue. The residue typically comprises cellulose, protein, and a residual amount of lipid. The amount of oil that can be recovered from oil crops by pressing is limited, because high pressure pressing tends to contaminate the oil with other plant residues, which negatively impact the quality and the stability of the oil. Consequently, oil producing plants generate large amounts of biomass waste comprising significant amounts of lipids. These lipids may be removed by extraction, which requires the use of volatile organic chemicals (VOCs), the handling of which requires expensive equipment.

Another abundant source of lipid-containing biomass is algae. Algae are particularly attractive, because as a genus they convert solar energy to biomass far more efficiently than land-based plants. Moreover, many algae species thrive in salt or brackish water, thus avoiding the need for precious fresh water. The cultivation of algae is an attractive option for arid coastal areas, which have an abundant supply of solar energy and sea water.

Unlike land-based plants, algae contain little or no lignin. Pressing techniques as are used for the recovery of oils from land-based crops are in general not suitable for separating the oils from algae biomass. The cell walls are too weak to withstand the pressing action. In general, separating the lipids from the rest of the algae biomass requires an expensive process, which thus far has limited the use of algae crops.

Rayne et al., *Rapid Dissolution of Lignocellulosic Plant Materials in Ionic Liquid*, Nature Precedings hdl:10101/npre.2007.637.1, posted 7 Aug. 2007, reports on experiments with six different lignocellulosic materials. Dissolution limits for the six biomass types were approximately 5%. The ionic liquid used was 3,3'-ethane-1,2-diylbis(1-methyl-1H-imidazol-3ium. The biomass types were substantially lipid free.

United States Patent Application Publication 2006/0241287, published Oct. 26, 2006, discloses a method for using ionic liquids to extract and separate a biopolymer from a biomass containing the biopolymer. The examples relate to the dissolution of polyhydroxyalkanoate (PHA); the extraction of PHA from a biomass; and the dissolution and recovery of keratin. The ionic liquids are all organic.

Thus, there is a particular need for a process for the conversion of lipid-containing biomass. Preferably this process uses low cost biomass material as the feed. The process may be used to convert biomass to liquid fuel, and/or platform chemicals.

BRIEF SUMMARY OF THE INVENTION

The present invention addresses these problems by providing a process for producing platform chemicals and/or liquid fuels from lipid-containing biomass, said process comprising the steps of: (i) providing lipid-containing biomass in a dry or semi-dry form; (ii) dissolving said lipid-containing biomass in an ionic liquid whereby a lipid phase and a hydrophilic phase are formed.

The lipid phase contains the lipid from the lipid-containing biomass. The hydrophilic phase contains cellulose, hemicellulose. The hydrophilic phase may further contain dissolved protein.

DETAILED DESCRIPTION OF THE INVENTION

The following is a description of certain embodiments of the invention, given by way of example only.

Lipid-containing biomass is particularly attractive for use as a source for bio-fuels, because the lipid component has a high energy density. A significant drawback is the presence of other biopolymers, such as cellulose. In general, the lipid component must be separated from the other biopolymers before it is processed further. Conversion of the lipid component to a bio-fuel generally involves transesterification of glycerol esters to methyl- or ethyl-esters. The other biopolymers, such as cellulose, can be converted to bio-fuels using techniques such as mild pyrolysis.

The most commonly used technique for separating the lipid component from a lipidcontaining biomass is pressing. This technique is suitable for biomass from land-based plants, as the presence of lignin permits the use of considerable pressures. This technique is not suitable for aquatic biomass, such as algae, because these materials lack lignin. The cell walls of these materials are soft, and pressing results in a lipid component that is heavily contaminated with other biopolymers, such as lignin.

Even as applied to biomass from land-based plants, pressing has a serious drawback in that a significant portion of the lipid component stays behind in the non-lipid component. As a result the lipid yield remains well below the theoretical yield, and the remaining residue contains more lipid than is deemed desirable for the subsequent processing. Waste product from vegetable oil mills is sometimes used for animal feed. However, the oil content is generally too high to fit the balanced diet of ruminating animals.

Waste from vegetable oil mills may also be used as a solid fuel. However, solid fuels require high transportation costs, and the ash content of these waste materials is much higher than that of other solid fuels, such as coal.

Remaining lipids present in waste materials from vegetable oil mills may be extracted using a solvent extraction method. However, such processes require the handling of volatile organic chemicals (VOCs), and the extraction solvent needs to be separated from the lipid material. As a consequence, extraction processes tend to be expensive.

Aquatic biomass material, such as those derived from algae, typically comprise carbohydrates, lipids, and proteins. The relative amounts vary considerably with the algae species, as illustrated in Table I.

TABLE I

| Strain | Protein | Carbohydrates | Lipids |
|---|---|---|---|
| Scenedesmus obliquus | 50-56 | 10-17 | 12-14 |
| Scenedesmus quadricauda | 47 | — | 1.9 |
| Scenedesmus dimorphus | 8-18 | 21-52 | 16-40 |
| Chlamydomonas rheinhardii | 48 | 17 | 21 |
| Chlorella vulgaris | 51-58 | 12-17 | 14-22 |
| Chlorella pyrenoidosa | 57 | 26 | 2 |
| Spirogyra sp. | 6-20 | 33-64 | 11-21 |
| Dunaliella bioculata | 49 | 4 | 8 |
| Dunaliella salina | 57 | 32 | 6 |
| Euglena gracilis | 39-61 | 14-18 | 14-20 |
| Prymnesium parvum | 28-45 | 25-33 | 22-38 |
| Tetraselmis maculata | 52 | 15 | 3 |
| Porphyridium cruentum | 28-39 | 40-57 | 9-14 |
| Spirulina platensis | 46-63 | 8-14 | 4-9 |
| Spirulina maxima | 60-71 | 13-16 | 6-7 |
| Synechoccus sp. | 63 | 15 | 11 |
| Anabaena cylindrica | 43-56 | 25-30 | 4-7 |

As discussed above, pressing techniques are generally not suitable for separating the lipids from the remainder of the aquatic biomass.

The present invention relates to a process for producing platform chemicals and/or liquid fuels from lipid-containing biomass, said process comprising the steps of: (i) providing lipid-containing biomass in a dry or semi-dry form; (ii) dissolving said lipid-containing biomass in an ionic liquid whereby a lipid phase and a hydrophilic phase are formed.

The term "ionic liquid" as used herein refers to a salt that has a melting temperature of about 120° C. or less, preferably about 100° C. or less, more preferably about 80° C. or less. Suitable examples include ionic liquids comprising an organic cation, such as ammonium, phosphonium, pyridinium, pyridazinium, pyramidinium, pyrazinium, imidazolium, pyrazolium, oxazolium, 1,2,3-triazolium, 1,2,4-triazolium, thiazolium, quinolium, isoquinolium, piperidinium, pyrrolidinium, and the like.

The organic cationic component is paired with an anionic component, for example selected from the group consisting of halides, C1-C6 carboxylates, C1-C6 alkyl sulfates, mono- or di-C1-C10 alkyl sulfosuccinates, mono- or di-C1-C10 ester sulfosuccinates, and mixtures thereof.

Many inorganic salt hydrates have melting points below 120° C. and, as such, meet the definition of ionic liquid. Examples are collected in Table II

TABLE II

| SALT HYDRATE | MELTING TEMPERATURE (° C.) |
|---|---|
| $LiClO_3 \cdot 3H_2O$ | 8 |
| $K_2HPO_4 \cdot 6H_2O$ | 13 |
| $KF \cdot 4H_2O$ | 18 |
| $ZnCl_2 \cdot xH_2O$ x > 2 | <20 |
| $CaCl_2 \cdot 6H_2O$ | 29 |
| $LiNO_3 \cdot 3H_2O$ | 29 |
| $Na_2SO_4 \cdot 10H_2O$ | 32 |
| $Na_2CO_3 \cdot 10H_2O$ | 33 |
| $KFe(SO_4)_2 \cdot 12H_2O$ | 33 |
| $LiBr \cdot 2H_2O$ | 34 |
| $CaBr_2 \cdot 6H_2O$ | 34 |
| $Zn(NO_3)_2 \cdot 6H_2O$ | 36 |
| $Na_2HPO_4 \cdot 12H_2O$ | 36 |
| $FeCl_3 \cdot 6H_2O$ | 37 |
| $CaCl_2 \cdot 4H_2O$ | 39 |
| $Ca(NO_3)_2 \cdot 4H_2O$ | 42 |
| $KF \cdot 2H_2O$ | 42 |
| $Fe(NO_3)_3 \cdot 9H_2O$ | 47 |
| $Na_2HPO_4 \cdot 7H_2O$ | 48 |
| $Zn(NO_3)_2 \cdot 2H_2O$ | 55 |
| $NaCH_3COO \cdot 3H_2O$ | 58 |
| $NaAl(SO_4)_2 \cdot 12H_2O$ | 61 |
| $Al(NO_3)_3 \cdot 9H_2O$ | 70 |
| $LiCH_3COO \cdot 3H_2O$ | 70 |
| $Na_3PO_4 \cdot 12H_2O$ | 72 |
| $Na_4P_2O_7 \cdot 10H_2O$ | 76 |
| $Ba(OH)_2 \cdot 8H_2O$ | 78 |
| $Al_2(SO_4)_3 \cdot 18H_2O$ | 88 |
| $Sr(OH)_2 \cdot 8H_2O$ | 89 |
| $Mg(NO_3)_2 \cdot 6H_2O$ | 89 |
| $LiCl \cdot H_2O$ | 99 |

Mixtures of salt hydrates are also suitable. Several ternary systems form eutectic mixtures with melting points well below those of each of the components.

The inorganic salt hydrates are much less expensive than the organic ionic liquids, and for that reason they are preferred for use in the process of the present invention. Particularly preferred is $ZnCl2.x H2O$, wherein x>2.

The lipid-containing biomass that serves as the feed material for the process of the present invention can be any biomass containing lipid materials as well as biopolymers. The lipid materials are generally in the form of glycerides. The term "glycerides" encompasses mono-, di- and triglycerides, and mixtures thereof. In most cases the lipids are in the form of triglycerides. Triglycerides of plant origin are usually liquid at 25° C., and are commonly referred to as vegetable oils. Less prominent are triglycerides of vegetable origin that are solid at 25° C.; these materials are sometimes referred to as waxes.

The biopolymers present in the biomass material generally include cellulose. Biomass from land-based plants generally further contains hemicellulose and lignin. Aquatic biomass may contain hemicellulose, but generally does not contain significant amounts of lignin.

Protein is another example of biopolymer that may be present in the biomass. As shown in Table I, protein is a common component of algae biomass. Protein is also generally present in seeds of land-based plants. As for many plants the seeds are the lipid containing portions of the plant, waste materials from vegetable oil mills often contain significant quantities of protein.

It has been discovered that plant proteins, in their natural form, are soluble in the ionic liquid medium. This is important for the economic operation of the process of the invention.

For the process of the invention, the lipid-containing biomass material preferably is in a dry or semi-dry form. The term "dry" as used herein refers to biomass material that is substantially water-free. It will be understood that it is virtually impossible to dry biomass material to 0% water content without forming char. For the present purpose biomass is considered "dry" if it contains less than 10 wt % water.

The term "semi-dry" as used herein refers to biomass containing more than 10 wt % water, but having a moisture level low enough for the biomass to be free-flowing when its particle size is less than 5 cm. For many types of biomass this is the case if the water level is less than 35 wt %.

If necessary, the biomass material may be dried to bring it into the dry or semi-dry state. Drying may involve heating the drying mass, in order to accelerate the evaporation of water. If the biomass contains protein, however, care should be taken to avoid denaturation of the protein. In general, denaturation negatively affects the solubility of the protein in the ionic liquid medium.

Prior to dissolving the biomass material in the ionic liquid medium, it is desirable to reduce its particle size to less than 5 cm, preferably less than 5 mm, more preferably less than 1 mm. Any suitable particle size reduction step may be used, including milling, grinding, and the like.

Dissolution of the biomass material may be facilitated by heating and/or stirring. Protein as may be present in the biomass material tends to dissolve before it is denatured, so that dissolution temperatures may be employed that are, in the absence of ionic liquid, high enough to cause denaturation of the protein. In general, suitable temperatures are in the range of from 60 to 120° C., temperatures between 70 and 90° C. being preferred.

Upon dissolution of the biomass material a lipid phase and a hydrophilic phase are formed. Absent stirring or other forms of agitation, the lipid phase assembles on top of the hydrophilic phase. The lipid phase contains the lipid material of the lipid-containing biomass (i.e., oil and/or wax, it being understood that wax is generally in the molten state at the dissolution temperature). The lipid phase further contains lipid-soluble components as may be present in the biomass material, such as fat-soluble vitamins.

Depending on the source of the biomass, the lipid phase may contain enough valuable compounds to warrant their separation from the triglycerides. For example, algae are known to be a rich source of vitamins. Fat-soluble vitamins can be recovered from the lipid phase using any suitable technique, such as solvent extraction.

The triglyceride portion of the lipid phase may be converted to biodiesel, for example by transesterification to the methyl ester.

The hydrophilic phase contains the ionic liquid, water, and dissolved biopolymer. Depending on the composition of the biomass material the dissolved biopolymer comprises cellulose and/or hemicellulose, and/or protein. The hydrophilic phase further comprises dissolved inorganic compounds from the biomass material. The inorganic components are generally referred to as "ash".

Lignin is generally not soluble in the ionic liquid. If the biomass contains lignin a third phase develops, which contains the lignin. If the ash content exceeds the solubility of the ash in the ionic liquid, undissolved inorganic material separates out from the hydrophilic phase. It becomes mixed with the lignin, if present.

The lipid phase is readily separated from the hydrophilic phase, by any known phase separation technique, such as skimming, centrifuging, and the like.

The undissolved phase, comprising lignin and, in some cases, part of the ash, can be separated from the hydrophilic phase by any solid/liquid separation technique, such as screening, filtering, or centrifuging. In order to remove ash from the lignin the undissolved phase may be washed with water. Ash can is recovered by evaporating the water. The ash is highly suitable for use as a fertilizer, as its composition corresponds to the requirements of the crops from which it was obtained.

It is desirable to remove water from the hydrophilic phase. This may be done by heating the hydrophilic phase to a temperature above 100° C. If it is desirable to operate at lower temperatures, for example to avoid denaturation of any protein present in the hydrophilic phase, it is possible to remove the water by applying a reduced pressure, such that the saturated steam pressure corresponding to the temperature of the hydrophilic phase exceeds the pressure applied to the liquid. Under such conditions water will readily evaporate from the mixture.

In a preferred embodiment water is continuously removed from the hydrophilic phase as the dissolution of biomass material progresses. This will happen spontaneously if the dissolution temperature is above 100° C. If the dissolution temperature is below 100° C., water evaporation can be induced by reducing the pressure.

In general, ash will precipitate from the hydrophilic phase as water is removed from it. Once precipitated, ash is readily removed from the hydrophilic phase by any solid/liquid separation technique, such as screening, filtration, or centrifuging.

Dissolved biopolymers in the hydrophilic phase can conveniently be converted in situ to compounds that are insoluble in the ionic liquid. Such reactions are described in detail for the case of cellulose in our co-pending applications EP 08152706.1 and PCT/EP 2008/058044. Once dissolved, hemicellulose has the same reactive properties as cellulose.

Alternatively, the dissolved biopolymers may be converted to electric energy using suitable fuel cell electrodes. Graphite and gold are particularly suitable electrode materials.

Likewise, dissolved protein can be converted to compounds that are insoluble in the ionic liquid. Alternatively dissolved protein can be rendered insoluble by denaturation, for example by raising the temperature of the solution and/or removing water from the solution. Once insolubilized, the protein can readily be separated from the solution by filtration, centrifugation, or other separation techniques known in the art.

Thus, the invention has been described by reference to certain embodiments discussed above. It will be recognized that these embodiments are susceptible to various modifications and alternative forms well known to those of skill in the art. For example, the process may be modified by varying the cellulose/protein ratio of the feedstock, by varying the in situ reaction scheme, etc.

What is claimed is:

1. A process for separating lipids from lipid-containing biomass for use in producing platform chemicals and/or liquid fuels, said process comprising the steps of:
   (i) providing lipid-containing biomass having a water content from 0 wt % to 35 wt %;
   (ii) dissolving said lipid-containing biomass in a molten inorganic salt hydrate having a melting point of 120° C. or lower, whereby a lipid phase and a hydrophilic phase are formed; and
   (iii) separating the lipid phase from the hydrophilic phase.

2. The process of claim 1, wherein the hydrophilic phase comprises cellulose and protein dissolved in the ionic liquid.

3. The process of claim 1, wherein the inorganic salt hydrate comprises a hydrate of zinc chloride.

4. The process of claim 1, wherein when the lipid-containing biomass has a water content from greater than 0 wt % to 35 wt %, step (ii) is conducted in a manner such that water is continuously removed from the solution.

5. The process of claim 1, wherein the lipid phase is subjected to a transesterification step to form a biodiesel.

6. The process of claim 1, wherein the lipid phase comprises glycerol esters, and wherein the glycerol esters are subsequently transesterified to methyl-esters or ethyl-esters.

7. The process of claim 1, wherein the lipid-containing biomass comprises waste from a vegetable oil mill.

8. The process of claim 1, wherein ash is precipitated out from the hydrophilic phase and configured for use as a fertilizer.

9. The process of claim 1, wherein the hydrophilic phase comprises dissolved biopolymers, and wherein the dissolved biopolymers are converted into electric energy using fuel cell electrodes.

10. The process of claim 1, wherein the lignin from the hydrophilic phase is washed out and recovered via evaporation.

11. The process of claim 2, wherein the cellulose and protein dissolved in the hydrophilic phase are subjected to conversion reactions whereby the cellulose and protein are converted to compounds that are insoluble in the ionic liquid.

12. The process of claim 4, wherein step (ii) is conducted at a temperature in the range of from 95 to 120° C.

13. The process of claim 4, wherein step (ii) is conducted at a reduced pressure, such that the saturated steam pressure corresponding to the temperature of the hydrophilic phase exceeds the pressure applied to the liquid.

14. The process of claim 5, wherein the transesterification step comprises the formation of fatty acid methyl esters.

15. The process of claim 11, wherein the conversion reactions comprise steps selected from the group consisting of hydrogenation, selective oxidation, aldol reactions, and combinations thereof.

16. The process of claim 15, comprising a hydrogenation step conducted in the presence of a Raney catalyst.

* * * * *